United States Patent Office 3,451,219
Patented June 24, 1969

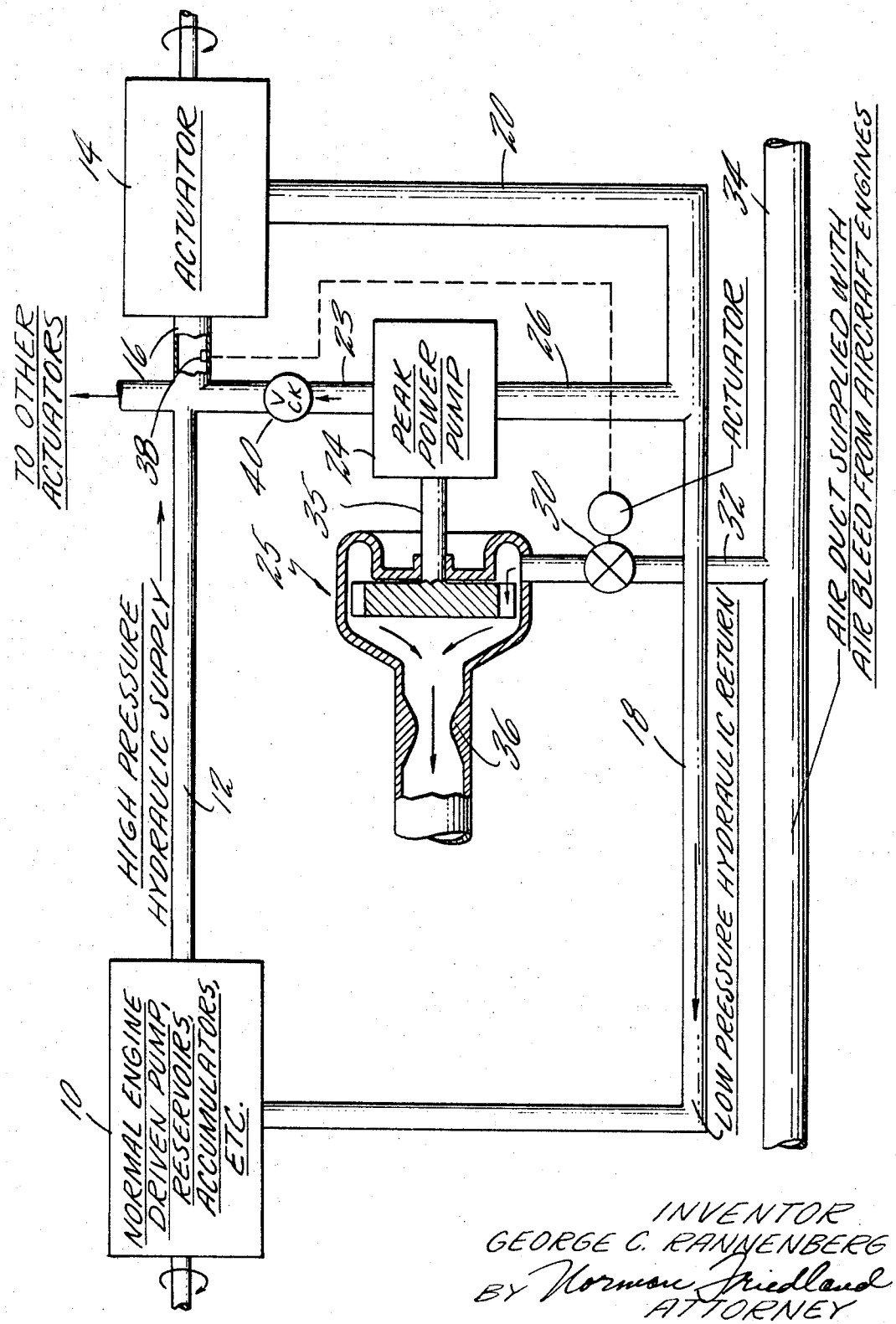

3,451,219
HYDRAULIC TRANSMISSION SYSTEM
George C. Rannenberg, Granby, Conn., assignor to United Aircraft Corporation, East Hartford, Conn., a corporation of Delaware
Filed Feb. 28, 1968, Ser. No. 708,874
Int. Cl. F15b *13/09*
U.S. Cl. 60—52         7 Claims

ABSTRACT OF THE DISCLOSURE

The size of hydraulic transmission lines in a hydraulic actuating system utilizing engine driven pumps is reduced by incorporating a separate peak power pump mounted in close proximity to the hydraulic actuators, and utilizing air bleed from the engines of an aircraft for driving the pump. The size of the engine driven pumps is also reduced, since the pumps as well as the transmission lines may be sized for normal loads rather than peak loads.

Background of the invention

This invention relates to a hydraulic transmission system and particularly to such a transmission system utilized on aircraft where the actuators are remotely mounted from the pumps, accumulators and filters.

Since the advent of large aircraft, the transmission of hydraulic fluid from the supply to the actuators requires considerable length of pipeline which adds considerably to the overall weight of the aircraft.

In heretofore practice, the pump, reservoirs, accumulators and filters are remotely mounted from the actuator requiring a substantially large diameter pipeline to transmit sufficient hydraulic fluid during peak demands from the hydraulic actuators in a cold environment where fluid viscosity is the greatest. This size pipeline is not necessary during normal power requirements but the sizing of the pipeline must be dictated by the flow requirements during the peak power periods of operation. I have found that I can reduce the diameter of the pipe for a greater proportion of the transmission length by incorporating a pump located in proximity to the actuator and by driving the pump by an engine bleed powered turbine the overall weight of the system can be materially reduced which is of paramount importance in aircraft operation. In many installations the engine bleed air ducts are already available for other purposes, and so the pressurized air source is obtained without additional weight. Turbine is actuated for driving the pump only during periods where the normal transmission line does not supply sufficient quantity of hydraulic fluid. The engine driven pumps, as well as the transmission lines, may therefore be sized for normal loads rather than peak loads.

Summary of invention

A primary object of this invention is to provide an improved hydraulic transmission system.

In accordance with this invention the transmission line between the actuator and the pump is sized for normal flow capacity and a second pump incorporated adjacent to the hydraulic actuator is connected in parallel thereto. The pump is driven by a turbine powered by engine bleed.

Other features and advantages will be apparent from the specification and claims and from the accompanying drawings which illustrate an embodiment of the invention.

Description of the preferred embodiment

The sole figure shows schematically the hydraulic actuating system for aircraft wherein the engine driven pumps, reservoirs, and accumulators shown in the blank box 10 are sized for normal power operation for transmitting through pipeline 12 a supply of hydraulic fluid to the actuator shown in blank box 14. A larger pipeline 16 sized for peak loads is interconnected between the actuator and the smaller diameter pipeline 12. It being noted that the flow capacity of pipeline 12 and the pump capacity of the normal source system 10 is sufficient to handle the requirements of the actuator during normal power requirements. Similarly, the normal hydraulic flow is returned to the engine driven pump by return lines 20 and 18. Return line 18 is sized for normal flow in the same manner as line 12. Thus lines 12 and 18, and pump system 10, are sized for normal flow. Pipelines 20 and 16 being sized for peak power operation. Pipeline 20 branches off into the parallel connecting line 26 which is in communication with the peak power pump 24. A power turbine 25 is driven by engine bleed air obtained from duct 34 which in turn is supplied by air obtained by tapping the aircraft engine compressor. A throttle valve 30 disposed in branch line 32 in communication with air duct 34 serves to communicate pressurized air to the turbine for driving it which, in turn, drives the peak power pump 24 through shaft 35. The hydraulic fluid output of pump 24 is supplied to actuator 14 by lines 23 and 16 which are sized for peak power hydraulic flow. Pump 24 may be a centrifugal pump in order to accommodate the output speed of turbine 25 and eliminate the need for gears in place of shaft 35.

A vortex Venturi 36 mounted in the discharge end of the turbine is an optional feature which may be utilized to limit the turbine speed and hence, to maintain it within its structural integrity. For more detail of a vortex Venturi reference is hereby made to U.S. Patent No. 3,073,114 issued to H. S. Wood. Other conventional speed limiting devices may be otherwise used. A suitable pressure sensor illustrated generally by reference numeral 38 senses the hydraulic pressure available to the actuator 18 and actuates the turbine whenever hydraulic supply pressure goes below a predetermined value, hence, maintaining hydraulic pressure by adding hydraulic fluid to the output of the normal supply system 10. A check valve 40 may be incorporated to prevent the flow from backing up through peak power pump 24 when it is not in operation.

It should be understood that the invention is not limited to the particular embodiments shown and described herein, but that various changes and modifications may be made without departing from the spirit or scope of this novel concept as defined by the following claims.

What is claimed is:
1. An hydraulic supply system for delivering hydraulic fluid to an actuator remotely mounted from the hydraulic supply pump including:
   (a) a first pipe connected to said hydraulic supply pump,
   (b) a second pipe whose inner diameter is larger rela- tive to said first pipe connected to said actuator and communicating with said first pipe, (c) additional pump means in closer proximity to said actuator than said hydraulic supply pump, (d) means for returning fluid from said actuator to both said additional pump and said hydraulic supply pump, and (e) fluid expansion means for imparting movement to said additional pump.

2. For aircraft powered by an engine having an engine air bleed, an hydraulic supply system for delivering hydraulic fluid to an actuator remotely mounted from the hydraulic supply pump including:

(a) a first pipe connected to said hydraulic supply pump, (b) a second pipe whose inner diameter is large relative to said first pipe connected to said actuator and communicating with said first pipe, (c) additional pump means in closer proximity to said actuator than said hydraulic supply pump, (d) means for returning fluid from said actuator to both said additional pump and said hydraulic supply pump, and (e) fluid expansion means driven by the air in said engine air bleed for imparting movement to said additional pump.

3. An hydraulic system as claimed in claim 2 wherein said fluid expansion means is a turbine.

4. An hydraulic supply system adapted for aircraft driven by an engine which has an existing engine bleed duct for delivering hydraulic fluid to an actuator remotely mounted from the hydraulic supply pump including:

(a) first pipeline means including a supply and return pipes connected to said hydraulic supply pump, (b) second pipeline means including second supply and second return pipe whose inner diameter is larger relative to said first pipe connected to said actuator and communicating with said first pipe, (c) additional pump means in closer proximity to said actuator than said hydraulic supply pump and being in parallel relation therewith, and (d) fluid expansion means connected to said engine bleed duct for imparting movement to said additional pump.

5. An hydraulic supply system as claimed in claim 4 including means for actuating said additional pump during peak power demands of the actuator.

6. An hydraulic supply system as claimed in claim 4 including a one way check valve means disposed in said second supply pipe between said actuator and said additional pump preventing reverse flow therein.

7. An hydraulic supply system as claimed in claim 5 including pressure sensing means sensing the pressure in the second supply pipe, said means for actuating said additional pump being controlled by said pressure sensing means.

References Cited

UNITED STATES PATENTS 2,659,204  11/1953  Conway et al.
2,731,892  1/1956  Simmonds.

EDGAR W. GEOGHEGAN, *Primary Examiner.*

U.S. Cl. X.R.

60—11